United States Patent Office 3,264,313
Patented August 2, 1966

3,264,313
1-BUTENE-2,4-SULTAMS
Arthur D. Bliss, Guilford, Conn., assignor to Olin Mathieson Chemical Corporation, New Haven, Conn., a corporation of Virginia
No Drawing. Filed May 21, 1965, Ser. No. 457,851
2 Claims. (Cl. 260—301)

This invention relates to 1-butene-2,4-sultams having the following general formula:

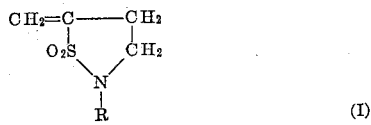

(I)

where R is hydrogen, lower alkyl (i.e., 1–4 carbon atoms) or phenyl.

A variety of saturated sultams has been previously prepared and described in the literature. For example, a number of sultams including γ-propane sultam, N-methyl-γ-propane sultam, butane sultam and the like have been prepared and disclosed in D.R.P., 740,814, and U.S. 2,866,786. The preparation of saturated sultams by the thermal treatment of chloroalkane sulfonic acid amides has also been disclosed by Helberger et al. in Annalen der Chemie, 562, 33 (1949). Sultams having unsaturated substituents have also been previously prepared. For instance, a mixture of 1,3- and 1,4-butanesultams was vinylated under alkaline conditions to provide mixed N-vinylsultams as disclosed in German patent application DAS 1,017,614, published October 17, 1957. However the preparation of unsaturated sultam derivatives where a methylene group is attached directly to one of the carbon atoms of the sultam ring has not heretofore been achieved.

Now it has been found that 1-butene-2,4-sultams of the Formula I are provided in high yield and purity by reacting halogenated α,β-unsaturated sulfonamides with alkali in accordance with the following equation wherein R is as represented in the foregoing discussion and X is chlorine or bromine.

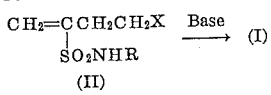

(II)

The halogenated α,β-unsaturated sulfonamide reactants (II) are provided by the reaction of the corresponding 1,4-dihalobutane-2-sulfonyl chlorides with ammonia or a primary amine RNH₂ where R is lower alkyl or phenyl in the presence of two moles of an acid acceptor. The preparation of these reactants is thoroughly disclosed in my copending application Serial No. 457,840 filed concurrently herewith.

The cyclization of the halogenated α,β-unsaturated sulfonamides (II) to the 1-butene-2,4-sultams is accomplished by contacting the sulfonamides with either an alkali metal hydroxide or an alkali metal alkoxide. Included among the suitable bases which may be utilized in this process are sodium hydroxide, potassium hydroxide, lithium hydroxide, sodium and potassium methylates, ethylates and the like. The preparations are carried out at reflux temperature in either an aqueous or alcoholic medium. However the use of an aqueous reaction system provides lower yields of the sultams, and the preferred process for the sultam preparation employs an alcoholic reaction system. By-product salt is conveniently removed from this alcoholic system by filtration whereupon an alcohol solution of the desired sultam is obtained. These solutions are advantageously treated with activated charcoal to remove small portions of impurities. Removal of the solvent provides the sultams in high purity.

1-butene-2,4-sultam and its N-methyl derivative, which are water-soluble, are conveniently copolymerized with vinylidene chloride in aqueous emulsion. For example, a monomer charge consisting of 80–95% vinylidene chloride and 5–20% 1-butene-2,4-sultam or its N-methyl derivative may be emulsified in water by agitation in the presence of an agent such as sulfated methyl oleate or any of the well-known emulsifying and/or dispersing agents and caused to polymerize by the action of a catalyst and activator, e.g., ammonium persulfate and sodium metabisulfite, in the amount of 0.1% to 1% by weight of monomer charge at a temperature of 25°–40° C. for a period of 3–5 hours. The resulting emulsion may be coagulated by known methods, such as the addition of aluminum sulfate and the copolymer purified by washing. Such copolymers containing from 3–15% of 1-butene-2,4-sultam or its N-methyl derivative are readily soluble in commonly used lacquer-coating solvents and provide excellent flexible, heat-sealable, moistureproof coatings when applied to regenerated cellulose films. In addition, such copolymeric coatings which contain 1-butene-2,4-sultam adhere strongly to regenerated cellulose films, and thus they resist the deteriorating effect of water or high moisture which tend to cause separation of the coating and base sheet.

Higher alkyl- or phenyl-substituted butenesultams included in the Formula I which are soluble in organic media may be copolymerized with vinylidene chloride either in aqueous emulsion, in bulk mixtures or in appropriate solvents, such as aromatic hydrocarbons or chlorinated aliphatic hydrocarbons. In the two latter cases, organic peroxides, such as dibenzoyl peroxide, are advantageously used as catalysts. Copolymers of this type have outstanding solubility and moistureproofing properties, although they do not adhere to regenerated cellulose film as strongly as the copolymers containing 1-butene-2,4-sultam.

The double bond in the 1-butene-2,4-sultams (I) is particularly reactive since it is immediately adjacent to and thus activated by the sulfonyl group. Thus the sultams (I) react readily with the halogens, especially chlorine, under mild reaction conditions to provide a series of halogenated sultams having utility as bactericides and fungicides.

Example 1 hereinafter is illustrative of the manner in which sultams included in the general Formula I are prepared. The preparation of N-benzenesulfonyl-1-butene-2,4-sultam in Example 2 confirmed the structure of 1-butene-2,4-sultam.

Example 1

To a solution of 9.203 g. (54.3 mmoles) of 4-chloro-1-butene-2-sulfonamide in 50 ml. of anhydrous methanol containing 0.2 g. of N,N-dimethylaniline, was added a solution of 2.173 g. (54.3 mmoles) of sodium hydroxide in 50 ml. of methanol. An intense yellow color developed immediately, but faded to pale yellow within 1 minute. After the solution had refluxed for 2 hours, bumping caused by precipitated salt became severe and the mixture was cooled and filtered. The salt was washed with 20 ml. of methanol and the filtrate and washings were combined and again refluxed. After a total of 8 hours at reflux, the solution had become neutral and was cooled and filtered. The filtrate was evaporated at reduced pressure, leaving a yellow oil and a substantial amount of salt. The oil was dissolved in 15 ml. of anhydrous ethanol and filtered. The combined salt residues from all of the operations were dried and found to weigh 3.026 g. (95.7%). The ethanol filtrate was treated with ether to faint turbidity and chilled, but only a small amount of dark yellow gum separated. The solution was decanted and evaporated in vacuo to a yellow oil, which weighed 6.61 g. (91.4%). Treatment of an ethanol solution of the oil with decolorizing carbon gave, on evaporation of the alcohol, 6.35 g. of a colorless oil which resisted all attempts at crystallization and darkened and became viscous on attempted distillation at 0.8 mm. The oil instantly decolorized permanganate and rapidly added bromine. Upon exposure to the atmosphere, it slowly developed a reddish color. It was identified as 1-butene-2,4-sultam on the basis of its infrared spectrum and elemental analysis. Principal infrared absorptions ($\mu$) were 3.05 (vs), 3.25 (m), 3.37 (m), 3.43 (m), 6.12 (w), 6.50 (w), 6.68 (m), 6.80 (m), 7.05 (s), 7.30 (s), 7.7 (vs), 8.60 (vs), 8.9 (vs), 9.65 (s), 10.0 (s), 10.4 (s), 10.75 (s), 11.4 (m), and 13.2 (b).

*Analysis.*—Calcd. for $C_4H_7NO_2S$: C, 36.07; H, 5.30; N, 10.52. Found: C, 36.25; H, 5.65; N, 10.84.

*Example 2*

To a solution of 1.4 g. (0.01 mole) of 1-butene-2,4-sultam in 20 ml. of water was added 0.8 g. (0.02 mole) of sodium hydroxide and 3.5 ml. (0.02 mole) of benzenesulfonyl chloride. The mixture was stirred for 6 hours at room temperature. A substantial amount of white solid was removed by filtration and washed three times with 20-ml. portions of water and six times with 20-ml. portions of ethanol. The odorless, neutral product was dissolved in acetone, treated with charcoal to remove a slight yellow color, and filtered. Evaporation of the filtrate gave 2.5 g. (91%) of white crystals melting at 133°–134° C. Three recrystallizations from ethanol raised the melting point to 134°–135° C. The material rapidly decolorized aqueous acidic permanganate and slowly added bromine. Its infrared spectrum showed no NH absorptions. The nuclear magnetic resonance spectrum showed resonances (from internal tetramethylsilane standard) at 2.95, 3.68, 5.7, and 6.0 p.p.m. The protons of the aromatic ring were in the normal position for a sulfone. The following elemental analysis indicated that N-benzenesulfonyl-1-butene-2,4-sultam had been obtained in high purity.

*Analysis.*—Calcd. for $C_{10}H_{11}NO_4S_2$: C, 43.94; H, 4.06; N, 5.13. Found: C, 44.06; H, 4.02; N, 5.13.

What is claimed is:

1. 1-butene-2,4-sultams having the formula

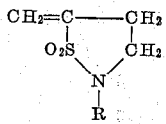

where R is selected from the class consisting of hydrogen, lower alkyl and phenyl.

2. 1-butene-2,4-sultam.

No references cited.

HENRY R. JILES, *Acting Primary Examiner.*
ALTON D. ROLLINS, *Assistant Examiner.*